US010750717B2

(12) United States Patent
Hickman-Miller

(10) Patent No.: US 10,750,717 B2
(45) Date of Patent: Aug. 25, 2020

(54) METHOD AND APPARATUS FOR SPATIAL COGNITIVE ASSESSMENT OF A LAB ANIMAL

(71) Applicant: Indiana University Research and Technology Corporation, Indianapolis, IN (US)

(72) Inventor: Debra L. Hickman-Miller, Sheridan, IN (US)

(73) Assignee: Indiana University Research and Technology Corporation, Indianapolis, IN (US)

(*) Notice: Subject to any disclaimer, the term of this patent is extended or adjusted under 35 U.S.C. 154(b) by 587 days.

(21) Appl. No.: 15/449,724

(22) Filed: Mar. 3, 2017

(65) Prior Publication Data

US 2017/0251629 A1 Sep. 7, 2017

Related U.S. Application Data

(60) Provisional application No. 62/304,060, filed on Mar. 4, 2016.

(51) Int. Cl.
*A01K 1/035* (2006.01)
*A01K 15/02* (2006.01)
*A01K 1/03* (2006.01)

(52) U.S. Cl.
CPC ............. *A01K 1/035* (2013.01); *A01K 1/03* (2013.01); *A01K 15/02* (2013.01); *A01K 15/029* (2013.01)

(58) Field of Classification Search
CPC .......... A01K 1/035; A01K 1/03; A01K 1/031; A01K 15/029; A01K 15/027; A01K 15/02; A01K 29/005
See application file for complete search history.

(56) References Cited

U.S. PATENT DOCUMENTS

| | | | | |
|---|---|---|---|---|
| 3,742,908 A * | 7/1973 | Merino | .................... | A01K 1/03 119/455 |
| 3,857,364 A * | 12/1974 | Miller, Jr. | .............. | A01K 1/031 119/417 |
| 4,953,502 A * | 9/1990 | Hoover | ................ | A01K 15/025 119/416 |
| 4,968,974 A * | 11/1990 | Sakano | .................. | A01K 1/031 119/421 |
| 4,969,417 A * | 11/1990 | Sakano | .................. | A01K 1/031 119/421 |
| 6,032,614 A * | 3/2000 | Tominaga | ................ | A01K 1/03 119/452 |

(Continued)

*Primary Examiner* — Joshua D Huson
(74) *Attorney, Agent, or Firm* — Faegre Drinker Biddle & Reath LLP

(57) ABSTRACT

The present disclosure relates to a method and apparatus for performing a cognitive bias assay on a lab animal. The apparatus may include a first base member and a second base member spaced apart from the first base member to form an interior region between the first and second base members. The second base member may include a plurality of spaced apertures providing access to the interior region. Each of the plurality of apertures may be sized to receive a lab animal. The second base member may be configured to support the lab animal. The apparatus may further include a stimulus device operative to project an aversive stimulus towards the second base member.

15 Claims, 8 Drawing Sheets

(56) References Cited

U.S. PATENT DOCUMENTS

| | | | | |
|---|---|---|---|---|
| 8,485,133 | B1* | 7/2013 | Osmekhin | A01K 1/031 119/416 |
| 8,763,559 | B2* | 7/2014 | Salzmann | A01K 1/031 119/421 |
| 2003/0024482 | A1* | 2/2003 | Gondhalekar | A01K 1/031 119/417 |
| 2004/0142313 | A1* | 7/2004 | Kurokawa | A01K 1/031 434/236 |
| 2009/0296992 | A1* | 12/2009 | Liang | A61B 5/1113 382/110 |
| 2012/0079993 | A1* | 4/2012 | Ennaceur | A01K 1/031 119/753 |
| 2012/0180731 | A1* | 7/2012 | Garner | A01K 1/031 119/417 |
| 2012/0234256 | A1* | 9/2012 | Harte | A01K 1/031 119/421 |

* cited by examiner

METHOD AND APPARATUS FOR SPATIAL COGNITIVE ASSESSMENT OF A LAB ANIMAL

CROSS REFERENCE TO RELATED APPLICATION

This application claims priority under 35 U.S.C. § 119 to U.S. Provisional Patent Application No. 62/304,060, filed Mar. 4, 2016 and entitled "Method and Apparatus for Spatial Cognitive Assessment of a Lab Animal", the entire disclosure of which is hereby incorporated by reference herein.

FIELD

The present disclosure relates to a cognitive bias assay device, and more particularly to a spatial discrimination assay device for a laboratory animal.

BACKGROUND

Cognitive bias assays are used as tools for evaluating the affective or emotional states of multiple species. An operant conditioning chamber, or Skinner box, is one example of an apparatus for performing cognitive bias assays on lab animals. Many cognitive bias assays, such as spatial discrimination assays, are designed for rats and often do not translate well to other species such as mice. For example, a spatial arena has been proposed that assesses a rat's cognitive bias based on the food instinct. In the spatial arena, food is placed at two different locations in the arena. At a first location, the food is accessible to the rat. At a second location, the food is trapped under a mesh such that while the food is seen and smelled by the rat, the food is inaccessible to the rat. The rat may learn not to expect food at the second location. The emotional state of the rat is assessed based on whether the rat attempts to get food at ambiguous intermediate location(s).

Some researchers have used cognitive bias assays based upon olfactory cues for rodents. For example, mice were trained with two distinct odor cues predicting either a palatable or unpalatable food treat. Subsequently, a mouse's reaction to mixtures of the odors (i.e., the ambiguous stimuli) was investigated. Variations were found in the ability of different strains of mice to distinguish between ambiguous odors, thereby weakening the ability of this test to provide meaningful and repeatable measurements of a mouse's affective state. Further, concerns exist on the ability to reliably produce appropriate olfactory cues to achieve sensitivity of assessment while avoiding odor contamination. Also, the ability to effectively eradicate all odors, including the intentional exposure odors, is problematic with animals (e.g., mice) that have highly developed levels of olfactory sensory capabilities.

As such, a physical or spatial discrimination assay is needed for distinguishing emotional affinity in lab animals. Many lab animals, such as mice for example, are burrowing creatures that prefer hidden, dark areas to open, lighted areas. Therefore, a need exists for a cognitive bias assay that is based on the burrowing tendencies of mice and other lab animals.

SUMMARY

An apparatus of the present disclosure provides a cognitive bias assay, particularly a spatial discrimination assay, for lab animals such as mice based on the preferences of mice for burrowing and darkness. The cognitive bias assay of the present disclosure is further based on the tendency of mice to avoid aversive events, such as mild shock, bright light, loud noises, and blowing air. Based on these tendencies of mice, the emotional affinity of mice may be assessed by introducing ambiguous stimuli with the apparatus. In some embodiments, the spatial discrimination assay of the present disclosure provides automated or semi-automated delivery of reinforcements and punishments and minimizes handling between training trials.

In an exemplary embodiment of the present disclosure, a cognitive bias assay apparatus for a lab animal is provided. The apparatus includes a first base member and a second base member spaced apart from the first base member to form an interior region between the first and second base members. The second base member includes a plurality of spaced apertures providing access to the interior region. Each of the plurality of apertures is sized to receive a lab animal. The second base member is configured to support the lab animal. The apparatus further includes a stimulus device operative to project an aversive stimulus towards the second base member.

In another exemplary embodiment of the present disclosure, a method of performing cognitive bias assay on a lab animal is provided. The method includes providing a device including a first base member and a second base member spaced apart from the first base member to form an interior region between the first and second base members. The second base member includes a plurality of spaced apertures providing access to the interior region, and each of the plurality of apertures is sized to receive a lab animal. The second base member is configured to support the lab animal. The method includes closing a subset of the plurality of apertures such that only a first aperture is open to the interior region. The method further includes placing the lab animal on the second base member of the device and projecting an aversive stimuli towards the second base member.

Additional features and advantages of the present disclosure will become apparent to those skilled in the art upon consideration of the following detailed description of the illustrative embodiments exemplifying the best mode of carrying out the invention.

BRIEF DESCRIPTION OF THE DRAWINGS

The detailed description of the drawings particularly refers to the accompanying figure in which.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION OF THE DRAWINGS

The embodiments of the disclosure described herein are not intended to be exhaustive or to limit the disclosure to the precise forms disclosed. Rather, the embodiments selected for description have been chosen to enable one skilled in the art to practice the subject matter of the disclosure. Although the disclosure describes specific configurations of a cognitive assessment device, it should be understood that the concepts presented herein may be used in other various configurations consistent with this disclosure.

Figure 1:
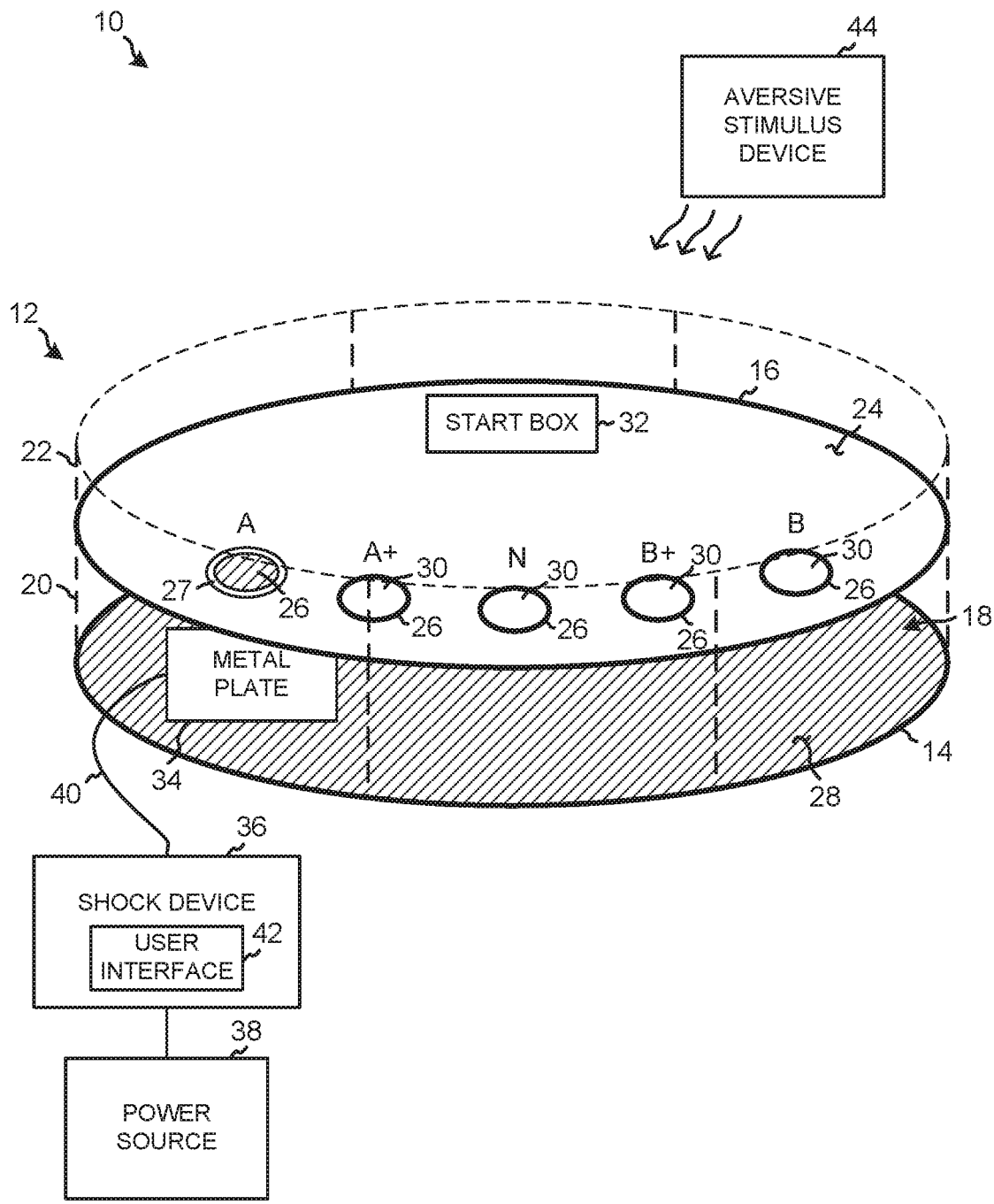
FIG. 1 illustrates an exemplary cognitive bias assay apparatus according to an embodiment of the present disclosure including an arena device, a shock device, and an aversive stimulus device.

Referring to FIG. 1, an exemplary cognitive bias assay apparatus 10 is illustrated. Apparatus 10 provides an arena for spatial discrimination assessments of mice. Apparatus 10 may also be used with other suitable lab animals, such as rats or other rodents, for example.

Apparatus 10 includes an arena device 12 that includes a first base member 14 and a second base member 16. First and second base members 14, 16 are illustratively plates or discs that are parallel to each other, although base members 14, 16 may have other suitable shapes. First base member 14 is at a lower level, and second base member 16 is spaced apart from first base member 14 at an upper level. An interior region 18 formed between first and second base members 14, 16 is sized to receive a lab animal, such as a mouse, for example. In the illustrated embodiment, device 12 includes a circumferential wall 20, shown in phantom, that is coupled around the outer perimeter of first and second base members 14, 16 and extends between base members 14, 16 to support second base member 16. Support pillars may be provided in interior region 18 to further support second base member 16 above first base member 14. Device 12 illustratively includes a circumferential wall 22, shown in phantom, coupled around second base member 16, illustratively at the outer edge of second base member 16, to form a walled region above second base member 16. Wall 22 has a height suitable for containing a lab animal positioned on a top surface 24 of second base member 16. In the illustrated embodiment, first and second base members 14, 16 are circular such that device 12 has a cylindrical outer profile, although other suitable shapes of base members 14, 16 and device 12 may be provided.

Second base member 16 includes a plurality of apertures or holes 26 that provide access to interior region 18 of device 12. Apertures 26 are illustratively circular in shape but may have other suitable shapes. In the illustrated embodiment, apertures 26 are equidistant from each other and are equidistant from the outer edge of second base member 16. As such, apertures 26 illustratively are aligned along an arc spaced apart from the outer edge of second base member 16. In the illustrated embodiment, covers or caps 30 are positioned over a subset of apertures 26 to close the corresponding apertures 26. Each cap 30 illustratively includes a thin plate, such as a plastic circular disk for example, that covers an aperture 26 to close off access to interior region 18 through the corresponding aperture 26. Caps 30 may have other suitable shapes. In the illustrated embodiment, a recessed annular seat 27 forms the perimeter around each aperture 26. Each seat 27 is recessed from the top surface 24 of second base member 16 and is configured to receive the corresponding cap 30. In one embodiment, only one aperture 26 is left open during an iteration of the cognitive bias assay, as described herein. For example, aperture 26 labeled A is illustratively open in FIG. 1, while apertures 26 labeled A+, N, B+, and B are covered with caps 30. A different aperture 26 may be left open by rearranging caps 30. In other embodiments, multiple apertures 26 may be left open during alternative assays.

As described herein, the lab animal is trained to distinguish between aperture locations A and B. For each lab animal, entry by the lab animal into one of locations A and B is assigned to be rewarded or reinforced. Positive reinforcement may include a lack of punishment (e.g., no electrical shock), the darkness of interior region 18, a food reward, and/or other suitable reinforcement. Entry by the lab animal into the other of locations A and B is assigned to be non-rewarded and may include a negative reinforcement (punishment) or aversive event such as electrical shock, bright light, noise, or blowing air, as described herein. In one embodiment, the assignment of locations A and B as being rewarded or non-rewarded is randomized within experimental groups of lab animals to reduce the likelihood of location bias on device 12.

In one embodiment, several interior walls are positioned in interior region 18 between first and second base members 14, 16. The interior walls form one or more enclosed compartments each aligned with one of the apertures 26 of second base member 16. For example, a compartment may be provided below each aperture location A and B. As such, a lab animal passing from top surface 24 of second base member 16 through one of apertures 26 enters a corresponding compartment in interior region 18. In one embodiment, the only exit from the enclosed compartment is back through the corresponding aperture 26. In one embodiment, the compartments are moveable to be aligned below different apertures 26. In one embodiment, second base member 16 is rotatable relative to first base member 14 such that different apertures 26 may be aligned with different compartments.

Figure 2:
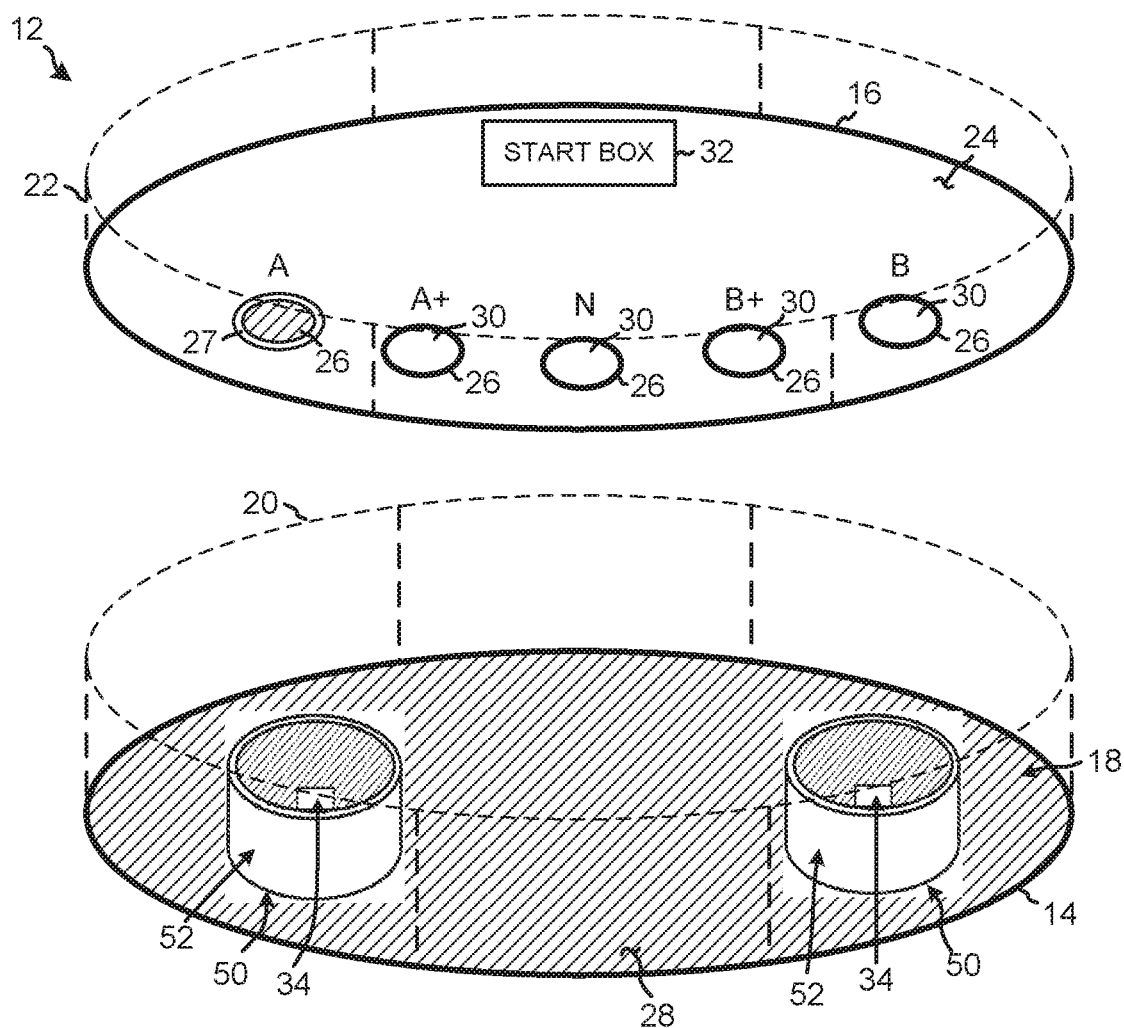
FIG. 2 illustrates a partially exploded view of the arena device of FIG. 1 including a plurality of compartments positioned in the interior region of the arena device.

Referring to FIG. 2, arena device 12 is illustrated with second base member 16 removed from first base member 14. A plurality of exemplary compartments 50 are positioned in interior region 18. Each compartment 50 includes a perimeter wall 52, illustratively cylindrical, to contain the lab animal upon entry into the compartment 50. While two compartments 50 are illustrated in FIG. 2, any suitable number of compartments 50 may be provided, such as a compartment 50 aligned with each aperture 26. Compartments 50 may be moveable or fixed within interior region 18. A metal plate 34, such as aluminum foil or another suitable electrical conductor, is positioned in each compartment 50 for selectively delivering electrical shock, as described herein.

Referring again to FIG. 1, a start box 32 is positioned on top surface 24 of second base member 16. Start box 32 may include a cup, a box, or any suitable container. In one embodiment, start box 32 is removeable from second base member 16. The lab animal is placed under the start box 32 prior to initiation of the experiment, and the start box 32 is lifted away from second base member 16 to allow the lab animal to navigate the arena device 12. In another embodiment, start box 32 is located outside of wall 22 of device 12, and wall 22 includes a sliding or hinged door to allow the animal to exit the start box 32 and to enter the arena.

Figure 3:
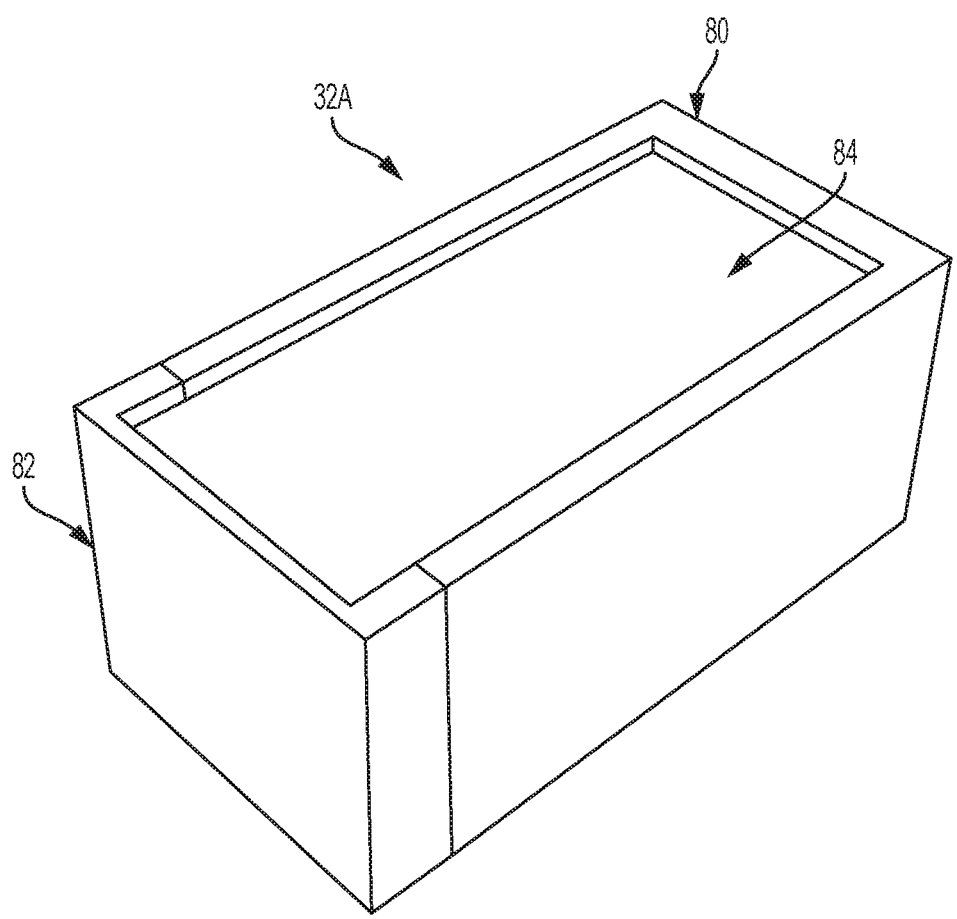
FIG. 3 illustrates a start box of the apparatus of FIG. 1 according to some embodiments.
Figure 4:
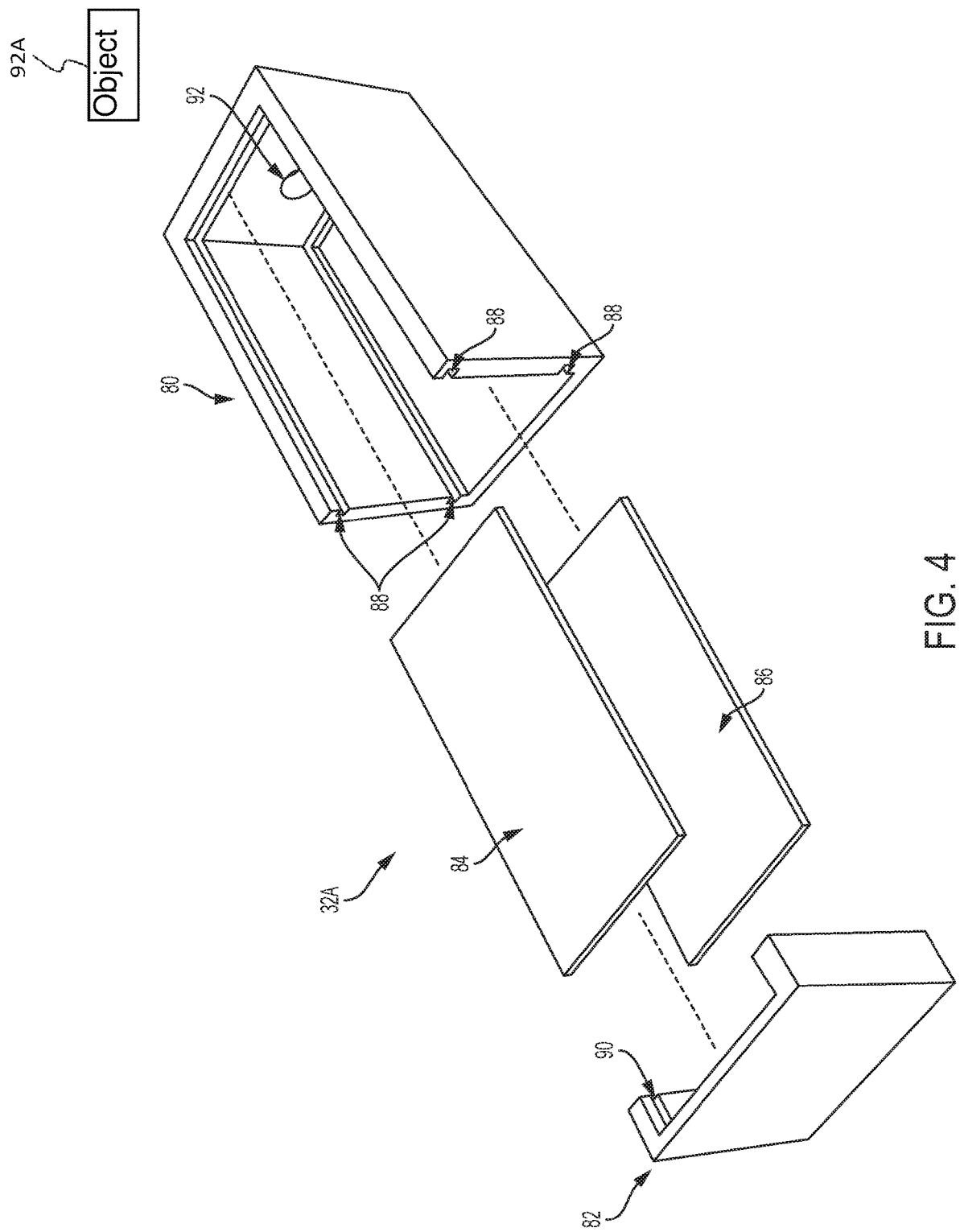
FIG. 4 illustrates an exploded perspective view of the start box of FIG. 3.

An exemplary start box 32A is illustrated in FIGS. 3 and 4. Start box 32A includes a main portion 80, an end cap 82, a ceiling portion 84, and a floor portion 86. Ceiling and floor portions 84, 86 slide into corresponding tracks or grooves 88, 90 of main portion 80 and end cap 82 to assemble start box 32A. Main portion 80 includes a hole or aperture 92 on one end that allows light into box 32A. Hole 92 is sized such that the lab animal cannot escape through the hole 92.

Hole 92 may also be used for the partial insertion of an object 92A into main portion 80 of start box 32A. Object 92A may be used to test a liquid food reward paradigm in lab animals as discussed in greater detail below. To stabilize the partially inserted object 92A in hole 92, a malleable material (e.g., clay) or a coupler (e.g., a stopper) may be used to frictionally engage object 92A with hole 92 to prevent further insertion or removal of object 92A within main portion 80 beyond a certain point unless a large amount of force is applied. Object 92A may be configured to have an indicator to signal whether the lab animal has engaged with object 92A to access the contents of object 92A (e.g. licking). In one embodiment, the partially inserted object 92A is a 1 mL syringe. However, it is contemplated that other objects may be partially inserted into hole 92. In an alternate embodiment, the indicator on object 92A may be an LED light; however, it is contemplated that other indicating mechanisms can be used for object 92A.

Object 92A is used for testing a cognitive bias assay, specifically a spatial discrimination assay within box 32A. The spatial discrimination assay includes a liquid food reward paradigm and an aversive shock paradigm. In the liquid food reward paradigm, a lab animal is placed in start box 32A as described in further detail below. An object 92A is placed partially through hole 92 as described above. Object 92A contains a liquid food reward (e.g., chocolate milk) that will be dispensed to the lab animal once the lab animal engages with object 92A. In an alternate embodiment, object 92A can be configured to dispense a solid food reward when the lab animal engages with object 92A (e.g., a food pellet).

In the aversive shock paradigm, the lab animal is placed in start box 32A as described in further detail below, and object 92A is placed partially through hole 92 as described above. In this paradigm, object 92A does not contain a liquid food reward (e.g., chocolate milk) that will be dispensed to the lab animal once the lab animal engages with object 92A. Rather, a stressor (e.g., an electrical shock) will be delivered to the lab animal if it engages with object 92A. It is contemplated that other stressors may be delivered in this paradigm as well.

In one embodiment, once the lab animal is placed in the start box 32A and the start box 32A is assembled, the box 32A is placed upside-down on the top surface 24 of second base member 16 (FIG. 1) such that ceiling portion 84 is adjacent the top surface 24. To initiate the experiment, the end cap 82 is removed together with the ceiling portion 84 (or ceiling portion 84 is removed through a slot formed in end cap 82) such that the lab animal is standing on top surface 24 of base member 16 underneath main portion 80. The start box 32A may then be lifted from the second base member 16 while the lab animal remains on the second base member 16.

In one embodiment, second base member 16 of FIGS. 1 and 2 is removeably coupled to first base member 14 via wall 20 such that second base member 16 may be detached from the device 12, as illustrated in FIG. 2. Removing second base member 16 provides access to interior region 18, such as for cleaning, maintenance, or retrieval of the lab animal.

In the illustrated embodiment, first and second base members 14, 16 are substantially opaque. In one embodiment, a top surface 28 of first base member 14 has a dark color, such as black or another suitable dark color, and top surface 24 of second base member 16 has a light color, such as white, for example. In one embodiment, the dark color of first base member 14 is configured to attract the lab animal based on the lab animal's tendency to migrate towards dark areas, as described herein. Top surface 24 of second base member 16 may alternatively be black or dark colored. In one embodiment, caps 30 are the same color as top surface 24.

At least one metal member 34, illustratively a metal paddle or plate 34, is positioned in interior region 18 of device 12. Metal plate 34 is illustratively positioned on top surface 28 of first base member 14 below aperture 26 labeled A. Metal plate 34 may be coupled to top surface 28 or coupled inside a compartment 50 (FIG. 2). Metal plate 34 is configured to provide a mild electrical shock to the lab animal upon the lab animal touching the plate 34. In particular, apparatus 10 includes an electronic shock device 36 coupled to a power source 38. Power source 38 may include a battery or other suitable source of electrical energy. Shock device 36 is configured to deliver electrical current from power source 38 to metal plate 34 via electrical wire 40 to energize the metal plate 34. In one embodiment, a metal plate 34 is provided under each aperture 26 such that each compartment of interior region 18 includes a metal plate 34 coupled to shock device 36. Shock device 36 is configured to selectively deliver electrical current to each of the metal plates 34. In one embodiment, shock device 36 includes a user interface 42 that provides user inputs for controlling the selective routing of electrical current to the metal plates 34 during the experiment. Based on which metal plate(s) 34 are energized, the lab animal may be trained to avoid entering certain apertures 26, as described herein. In one embodiment, metal plate 34 is positioned in or below one of the compartments of interior region 18 described herein. In one embodiment, a metal paddle 34 includes card stock lined with aluminum foil which is connected to electrical leads for delivering the shock. In one embodiment, a metal plate 34 is positioned in each compartment 50 of FIG. 2.

In another embodiment, a food reward is provided in place of metal plate 34 for training and testing the lab animal with device 12. For example, accessible food is placed in a compartment below aperture location A, and inaccessible food (e.g., food trapped below a mesh covering) is placed in a compartment below aperture location B or another suitable aperture.

Figure 8:
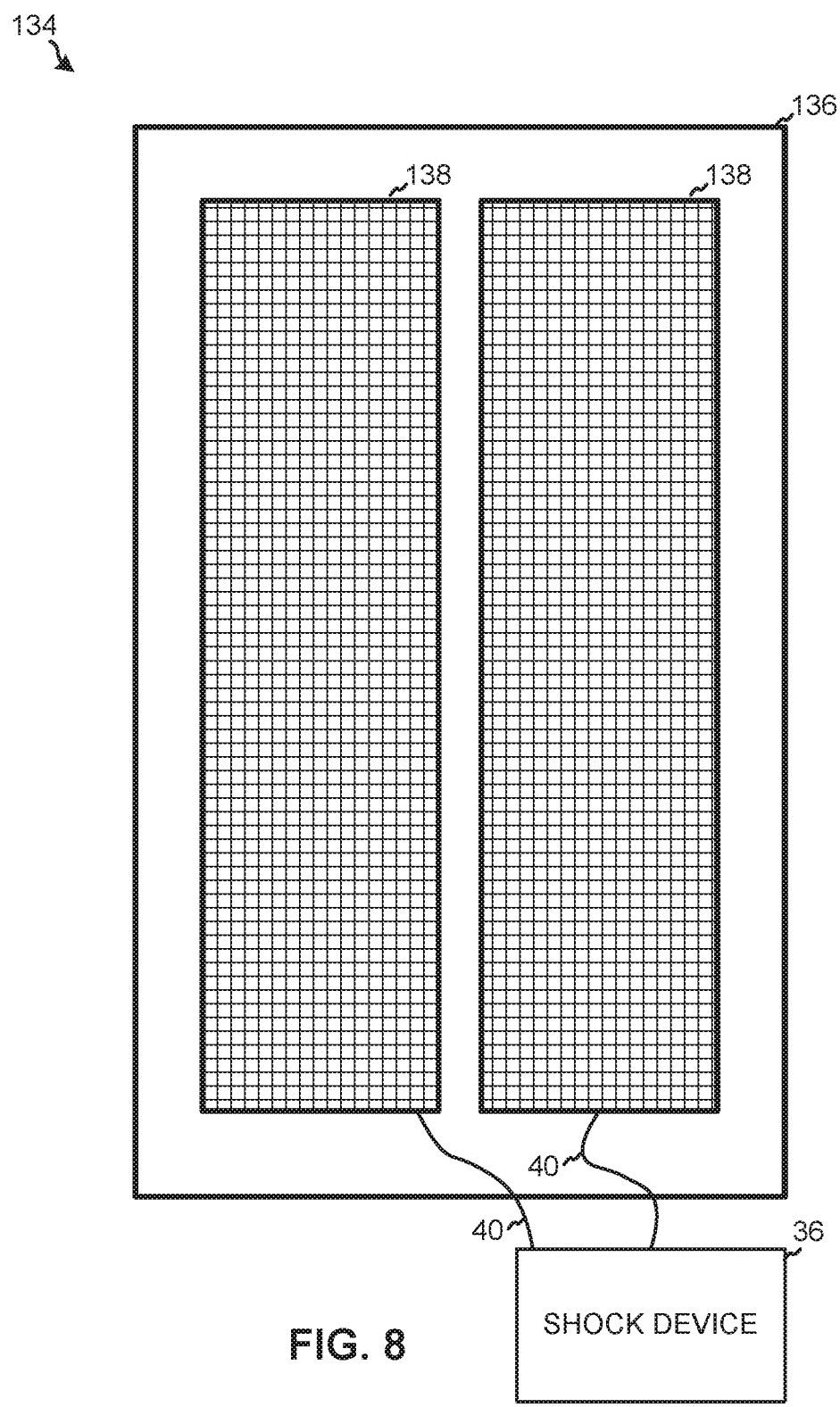
FIG. 8 illustrates a plate member configured for use with the apparatus of FIGS. 1, 2, 5, and 6 in both food trials and electric shock trials.

In another embodiment, metal member 34 of FIG. 1 is configured for use in both shock trials and diet/food trials. For example, referring to FIG. 8, an exemplary metal member 134 is illustrated including a frame 136 and a pair of wire mesh portions 138 coupled to the frame 136. In one embodiment, frame 136 is a non-conductive material such as plastic, and wire mesh portions 138 are a conductive material such as metal. The mesh portions 138 facilitate positioning an inaccessible food treat beneath the mesh 138 for food/diet trials. For electric shock trials, the mesh portions 138 are normally electrically isolated from each other via frame 136. When the lab animal stands on both mesh portions 138 at the same time, the lab animal completes the electrical circuit resulting in the delivery of an electric shock from shock device 36 through mesh portions 138. In one embodiment, frame 136 and mesh portions 138 are a dark color such as black.

Referring again to FIG. 1, apparatus 10 further includes an aversive stimulus device 44 positioned in proximity to arena device 12. Aversive stimulus device 44 is operative to generate a stimulus that is aversive to the lab animal to encourage the lab animal to seek shelter in interior region 18. In one embodiment, aversive stimulus device 44 is mounted to a support structure and aimed towards second base member 16. In one embodiment, aversive stimulus device 44 includes a lighting device (e.g., a lamp) that is operative to project light towards second base member 16. In one embodiment, the light color (e.g., white) of top surface 24 of second base member 16 is configured to reflect the light projected by the lighting device 44. The reflected light may further encourage the lab animal to escape the top surface 24 based on the lab animal's aversion to bright light. In another embodiment, aversive stimulus device 44 includes a white noise generator that is operative to project an audible signal (e.g., white noise) towards second base member 16. In another embodiment, aversive stimulus device 44 includes a fan device that is operative to blow air towards second base member 16. Other suitable aversive stimulus devices 44 may be provided. In one embodiment, each of the different types of aversive stimulus devices 44 are used and tested with the spatial discrimination assay.

In one example, base members 14, 16 are about 20 inches in diameter and are spaced apart about three to four inches. In this example, wall 20 has a height of about three to four inches. In one example, wall 22 also has a height of about three to four inches. In one example, base members 14, 16 each have a thickness of at least one-quarter inch and circumferential walls 20, 22 each have a thickness of at least about one-tenth inch. In one example, apertures 26 of second base member 16 are about one to two inches in diameter and are spaced about four inches apart from each other and about three to four inches from the outer edge of second base member 16. In the illustrated embodiment, second base member 16 includes five apertures 26, although another suitable number of apertures 26 may be provided. In some embodiments, first and second base members 14, 16 are made of a thermoplastic such as Plexiglas, wood with an epoxy painted top surface 24, 28, or another suitable material. Other suitable dimensions and materials for the components of device 12 may be provided.

An exemplary spatial discrimination assay using apparatus 10 includes a habitual phase, a training or "discriminatory task" phase, and a testing or "ambiguous location task" phase. In the habitual phase, the lab animal is allowed to roam device 12 without any aversive events, i.e., with aversive stimulus device 44 and metal plates 34 all deactivated. In the habitual phase, some or all of apertures 26 may be open to allow the lab animal to enter and explore interior region 18. As such, the lab animal becomes acclimated to the environment of apparatus 10. In an exemplary habitual phase, the lab animal is allowed to roam device 12 for approximately 30 minutes, although another suitable duration may be implemented. The lab animal may also be acclimated to the darkened start box 32 for a predetermined duration, such as approximately two minutes for example, prior to or at the start of the training phase.

In the training phase, the lab animal is placed under start box 32. A subset of apertures 26 are closed with caps 30 such that only one aperture 26 (e.g., see A of FIG. 1) is open. The aversive stimulus device 44 is activated to project the aversive stimulus towards device 12 to encourage the mouse to enter the open aperture A, but metal plate 34 beneath aperture A is not energized. Start box 32 is lifted to release the lab animal into the enclosed region above second base member 16. The lab animal is allowed to enter the open aperture A to escape the aversive stimulus without receiving a shock from metal plate 34, thereby positively reinforcing the lab animal with respect to aperture A.

After one or more iterations when the lab animal enters the open aperture A regularly, the training is changed. The opposite aperture B is opened while aperture A is closed with a cap 30. The intermediate apertures A+, N, and B+ remain closed. The metal plate 34 below aperture B is energized, and the lab animal is released from the start box 32. When the lab animal enters aperture B, the lab animal receives a mild shock from metal plate 34 to encourage the lab animal to leave the compartment, thereby negatively reinforcing the lab animal with respect to aperture B. In one embodiment, the latency times for the lab animal to enter the corresponding open aperture A, B are measured during the training phase. Training continues with alternatively opening apertures A and B until the lab animal is able to discriminate between apertures A and B. For example, the lab animal may eventually learn when presented with the aversive stimulus from device 44 to enter aperture A but to avoid aperture B due to the mild shock received via aperture B.

When the lab animal has learned to discriminate between apertures A and B, the testing phase of the spatial discrimination assay is executed by introducing ambiguous aperture locations. In the testing phase, the ambiguous apertures (intermediate apertures A+, N, B+) are selectively opened to probe the emotional affinity of the lab animal when the lab animal is faced with varying experimental conditions. In particular, the positive emotional affinity (e.g., optimism) or negative emotional affinity (e.g., pessimism) of the lab animal may be assessed based on whether the lab animal enters or avoids the ambiguous apertures as well as the latency times to enter the ambiguous apertures. For example, one of intermediate apertures A+, N, B+ is opened while the remaining apertures 26 are closed. The emotional affinity of the lab animals is assessed based on whether the lab animal escapes through the open aperture. The lab animal may be less likely to enter aperture B+ than aperture A+ because aperture B+ is closer to the "shock" location of aperture B while aperture A+ is closer to the "no shock" location of aperture A. If the lab animal is optimistic, the lab animal may be more likely to enter intermediate apertures that are further away from the "no shock" aperture A. If the lab animal is pessimistic, the lab animal may be less likely to enter intermediate apertures that are further away from the "no shock" aperture A. In one embodiment, none of the intermediate apertures A+, N, B+ have a negative reinforcement (e.g., electrical shock) upon entry by the lab animal.

Thus, based on the tendencies of some lab animals to burrow in dark areas and to avoid mild aversive events, the positive or negative emotional affinity of lab animals may be assessed with apparatus 10. If more optimistic, the lab animal may be more likely to enter the open aperture even if the open aperture is not at the exact "no shock" location, i.e., at an intermediate aperture A+, N, B+. If more pessimistic, the lab animal may be less likely to enter the open intermediate aperture. The latency times for the lab animal to enter the open intermediate apertures may be measured to further assess the emotional affinity of the lab animal.

Additional exemplary training and testing phases according to some embodiments are as follows. An exemplary training phase consists of nine trials for each lab animal per day, pseudo randomly assigned each day with no more than two consecutive presentations of the same aperture location (e.g., A-B-B-A-B-B-A-A-B). Fewer or additional trials may be implemented. For each trial, the lab animal is released from start box 32 and is given a maximum latency time (e.g., 120 seconds) to enter through the open aperture 26 (A or B). Entry into the open aperture 26 results in exposure to the positive reinforcement or punishment, as defined by the experiment. The latency time for entry into the lower level of device 12 through the open aperture 26 is recorded for each trial. If the maximum latency time is reached before the lab animal enters the lower level, the trial is stopped and the maximum latency time is recorded. Following each trial, device 12 is cleaned with a cleaning agent, such as ethanol, for example, before the next trial is started.

In an exemplary testing phase, the lab animal is presented with ten trials of testing sessions each testing day. Three total testing days are executed, with a non-testing or off day between each testing day. Fewer or additional testing days and trials per testing day may be provided. The lab animals are housed in either a normal or stressed environment between testing phase trials, as described herein. Ambiguous aperture locations (A+, B+, or N of FIG. 1) are presented during a subset of the ten trials each testing day, and the ambiguous aperture locations are presented in a different order each testing day. For example, the ambiguous aperture locations may be presented to the lab animal on the fourth, seventh, and tenth trial each day. An exemplary trial sequence of aperture locations for a testing day is A-A-B-[B+]-B-A-[A+]-B-A-[N], with the ambiguous aperture locations shown in brackets on the fourth, seventh, and tenth trial. Each ambiguous aperture location A+, B+, or N is neutral (no punishment) or has a punishment (e.g., electrical shock) to avoid reinforcing that location. The latency to enter the open aperture 26 is recorded for each trial.

In some embodiments, the lab animals are randomly assigned to one of two experimental groups including a control group and a "stressed" group. During the training phase when trials are not being performed, the lab animals in both the control group and stressed group are housed in a normal or stable environment with no daily stressors. During the testing phase when trials are not being performed, the lab animals in the stressed group are housed in a stressed or disrupted environment with exposure to mild daily stressors (e.g., wet cage, tilted cage, random noises, etc.). In some embodiments, following the training phase, the lab animal may be exposed to the change in their environment (stable versus stressed) for at least a minimum number of days (e.g., three days) before moving to the testing phase. If the stressed environment creates a negative emotional affinity (pessimism) in the lab animals, the latency times to enter the ambiguous aperture locations may be significantly increased compared to the latency times for the control group.

In one embodiment, some or all portions of the assay are performed manually by a handler. For example, a handler observes the lab animal and manually initiates the shock using an input device (e.g., button, switch, etc.) of user interface 42 of shock device 36 when the lab animal enters the open aperture 26 at the punishment location. The handler may also manually monitor and record the latency times for the lab animal to enter the open aperture 26. Further, the handler may manually remove the lab animal from the lower level and returns the lab animal to the start location following each trial.

Figure 5:
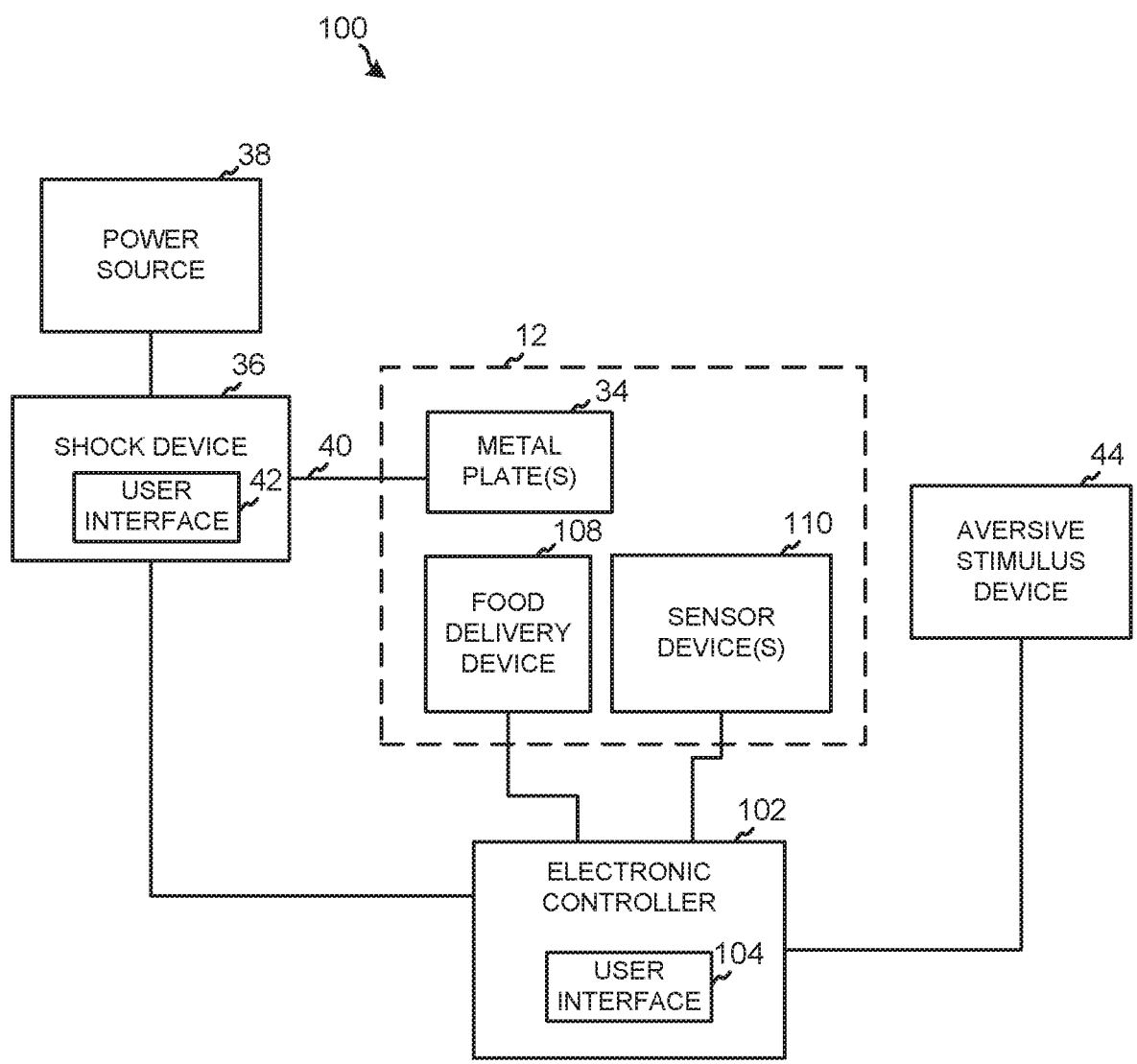
FIG. 5 illustrates the cognitive bias assay apparatus of FIG. 1 including a controller for automating one or more aspects of the cognitive bias assay.

In another embodiment, several aspects of the cognitive bias assay are automated. For example, an automated cognitive bias assay apparatus 100 is illustrated in FIG. 5. Apparatus 100 includes the arena device 12 of FIG. 1 and a controller 102 that provides for the automation of several features of the assay. Arena device 12 is shown diagrammatically in FIG. 5 for illustrative purposes. Controller 102 includes at least one processor and memory accessible by the at least one processor. The memory contains instructions that when executed by the at least one processor cause the at least one processor to perform the functions described herein. Controller 102 further includes a user interface 104, such as a graphical user interface including an input device, keyboard, mouse, and/or touchscreen, for receiving user input and displaying experimental results and data on a display. The user input may be entered to start/stop the assay and to set up parameters for the assay, including, for example, type and duration of aversive stimulus, timing and/or magnitude of aversive stimulus, location of open aperture, or any other suitable assay parameters. Controller 102 is operative to automate one or more of the following: the delivery of the training events including the delivery of the appropriate positive or negative reinforcement, the monitoring and recordation of the latency times for entry of the lab animal into the lower level, facilitating the transition of the lab animal from the lower level to the starting box between trials, and facilitating the initiation of the trial by controlling the release of the lab animal from start box 32.

Controller 102 is in communication with shock device 36 and aversive stimulus device 44 to control the timing and delivery of the aversive events with devices 36, 44. One or more sensor devices 110 are coupled to arena device 12 that provide feedback to controller 102 representative of the location of the lab animal. Sensor devices 110 include one or more presence sensors to detect a lab animal's entry through each of apertures 26. A sensor may be provided near each aperture 26 so that controller 102 can distinguish between entries into the different apertures 26. Additionally, one or more sensors 110 may be provided on the upper level of device 12 to detect a lab animal's exit from start box 32 and/or location on top surface 24 of second base member 16 (FIG. 1). Sensor devices 110 include proximity sensors, ultrasonic sensors, photoelectric sensors, and/or other suitable sensors for detecting the location and movement of the lab animal in arena device 12. Controller 102 is operative to record in memory the times associated with the detection of the lab animal at each sensed location to determine the latency times described herein.

In one embodiment, apparatus 100 includes a food delivery device 108 controlled by controller 102 for selectively delivering food pellets to the rewarded aperture locations in the lower level. Food delivery device 108 may include any suitable dispensing device actuated by electrical control signals from controller 102.

Figure 6:
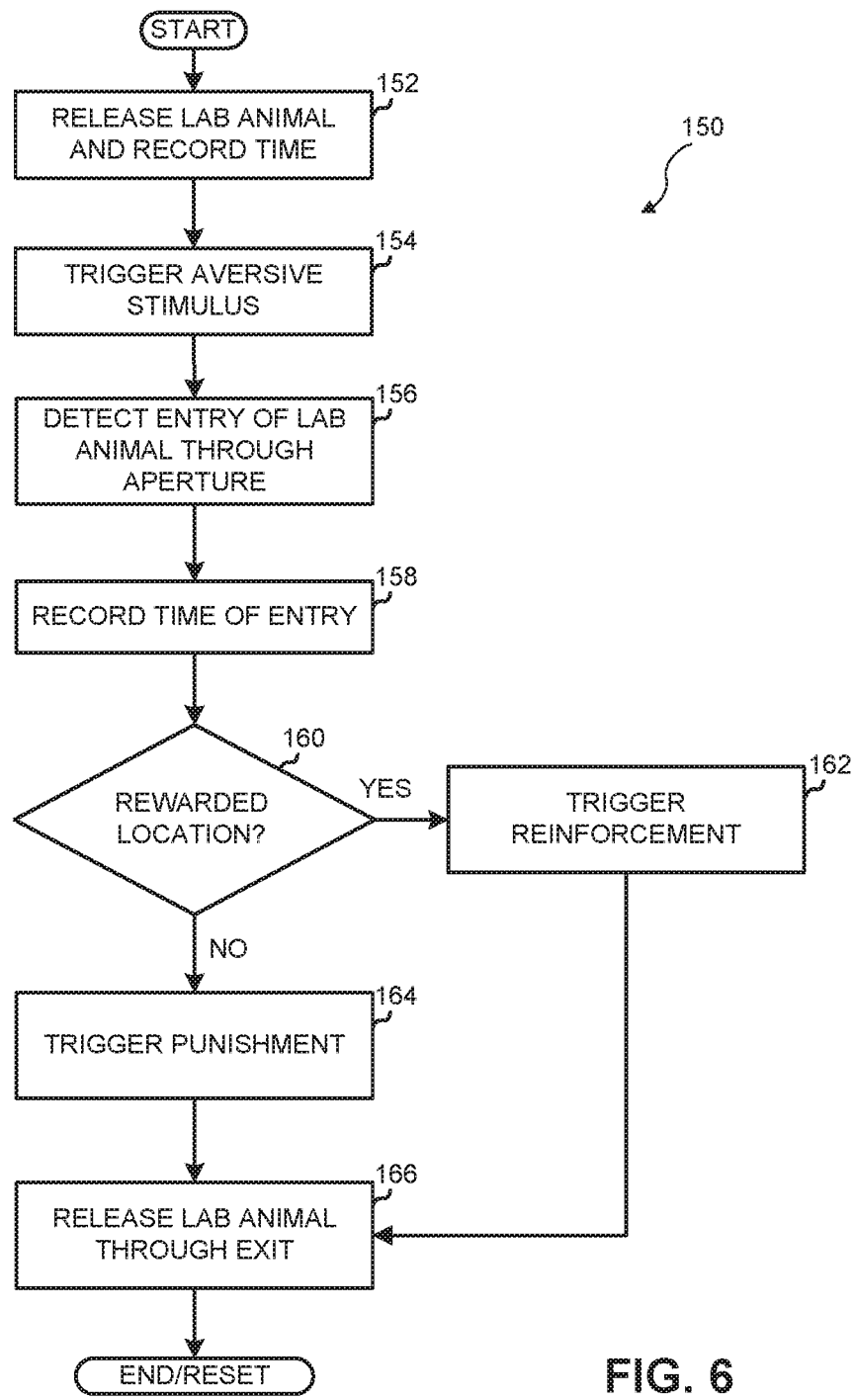
FIG. 6 illustrates an automated method of the cognitive bias assay at least partially executed by the electronic controller of FIG. 5, according to some embodiments.

FIG. 6 illustrates an exemplary automated operation of the cognitive bias assay as controlled by electronic controller 102 of FIG. 5. Reference is made to the apparatus 10 of FIGS. 1-5 throughout the description of FIG. 6. At block 152, the lab animal is released from start box 32. In one embodiment, controller 102 electrically controls an actuator that opens a door of start box 32 or lifts start box 32 from arena device 12 to release the lab animal. Alternatively, a user may manually remove or open start box 32, and controller 102 detects the removal or opening of start box 32 via one or more sensors. Controller 102 records a time of the release of the lab animal into arena device 12. At block 154, controller 102 is operative to transmit a control signal to aversive stimulus device 44 to initiate the aversive stimulus in response to the lab animal being in start box 32 or being released from start box 32. At block 156, controller 102 detects entry of the lab animal through an open aperture 26 via a sensor 110 (FIG. 5), and controller 102 records the time of entry through the open aperture 26 at block 158.

At block 160, controller 102 determines whether the location of the entered aperture 26 is a rewarded location or a punished location and triggers a corresponding training event based on the location of the aperture. In response to sensing the lab animal entering a rewarded aperture location (e.g. aperture A), controller 102 triggers a reinforcing event at block 162. For example, controller 102 sends a control signal to food delivery device 108 to cause the delivery of food pellets. Alternatively, the reinforcement may include not delivering an electrical shock wherein the metal plate 34 below aperture A is not energized. Similarly, in response to sensing the lab animal entering a non-rewarded aperture location (e.g., aperture B), controller 102 at block 164 triggers a punishment which may include transmitting a control signal to shock device 36 to deliver an electrical shock via the corresponding metal plate 34 of the non-rewarded aperture location. Alternatively, a punishment may include triggering a bright light, noise, or blowing air at the non-rewarded location or withholding a food reward.

In one embodiment, controller 102 at block 166 also facilitates the transition of the lab animal from the lower level to start box 32 or to a holding area between trials. For example, in response to detection of the lab animal in the lower level with sensing devices 110, controller 102 may open an electrically controlled exit door or passageway of arena device 12. The exit door may lead back to start box 32 or back to a holding area for the lab animal. Other suitable mechanisms for leading the lab animal out of the lower level of arena device 12 may be provided and controlled with controller 102.

In one embodiment, controller 102 is operative to detect and record the location of the lab animal anywhere in apparatus 10 based on feedback from sensing devices 110 of FIG. 5. As such, controller 102 is operative to track the traveled path of the lab animal as well as the time delay before the lab animal enters an open aperture 26. This recorded data may be used to assess the cognitive bias response of the lab animal, for example.

Thus, apparatus 100 incorporates an ability to automate the delivery of positive reinforcers (such as food pellets) or punishments (such as bright lights or mild shocks) individually or in various combinations. The cognitive bias response can vary depending on the condition under investigation. For example, depressed individuals may demonstrate heightened awareness of changes in positive events. Therefore, a testing paradigm provided with apparatus 100 where the depressed individuals are presented with a positive reinforce (such as food) as compared to a neutral reinforcer (such as no shock) may be more effective in identifying a cognitive bias in depressed individuals. However, as anxious individuals may demonstrate a heightened awareness of changes in negative events, a testing paradigm provided with apparatus 100 with a negative reinforcer (i.e., positive punishment) as compared to a neutral reinforcer may be more effective in identifying a cognitive bias in anxious individuals.

Figure 7:
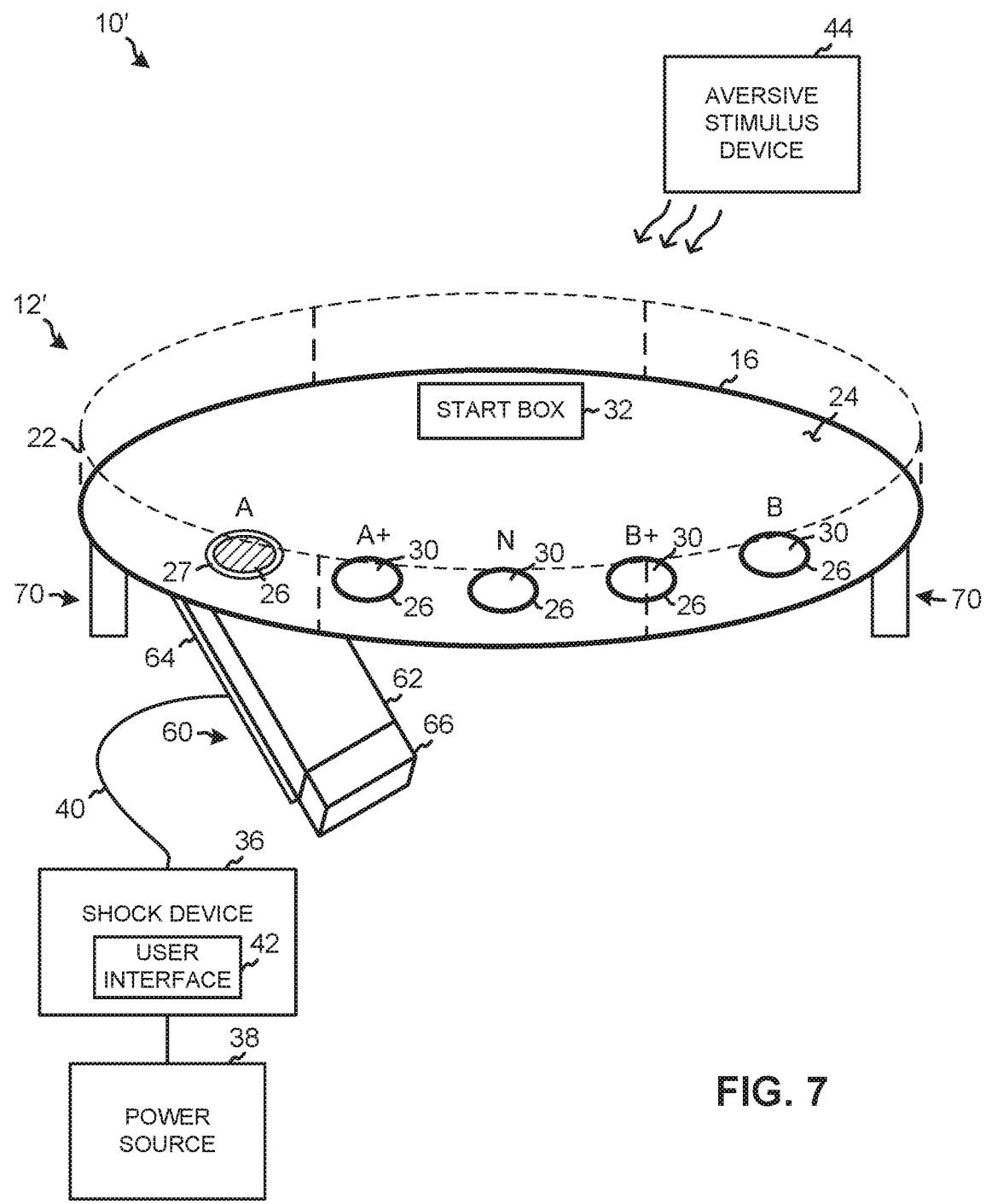
FIG. 7 illustrates a cognitive bias assay apparatus having an arena device according to another embodiment.

In an alternative embodiment illustrated in FIG. 7, a cognitive bias assay apparatus 10' includes modified arena device 12'. The exemplary assays described herein may be performed using apparatus 10'. In FIG. 7, the lower level of the apparatus 10 of FIG. 1 is removed and replaced with a single smaller compartment 60 coupled to second base member 16 beneath the open aperture 26. Compartment 60 may be moved and reattached below any of apertures 26. Compartment 60 includes a hollow box 62 configured to receive the lab animal entering through the open aperture 26. A removable cap 66 is coupled to an end of box 62 to provide access to the inside of box 62 for retrieving the lab animal. Metal plate 34 of FIG. 1, which may include aluminum foil, is secured inside compartment 60 and connected to shock device 36. Alternatively, a food reward, a light device, or other suitable reinforcement or punishment may be provided inside compartment 60 depending on the type of assay being performed. In the illustrated embodiment, compartment 60 includes a removable bottom wall 64 to provide additional access inside box 62 for installing metal plate 34, installing other reinforcements or punishments, cleaning, or performing maintenance. Legs 70 provide a support stand for device 12'. In one embodiment, electronic controller 102 of FIG. 5 provides automatic control of one or more aspects of a cognitive bias assay performed with apparatus 10' of FIG. 7.

While this disclosure has been described as having exemplary designs, the present disclosure can be further modified within the spirit and scope of this disclosure. This application is therefore intended to cover any variations, uses or adaptations of the disclosure using its general principles. Further, this application is intended to cover such departures from the present disclosure as come within known or customary practice in the art to which this disclosure pertains and which fall within the limits of the appended claims.

What is claimed is:

1. A cognitive bias assay apparatus for lab animals, the apparatus comprising:
a first base member at a first level;
a second base member at a second level above and spaced apart from the first base member to form an interior region between the first and second base members, the second base member including a plurality of spaced apertures providing access to the interior region, each of the plurality of apertures being sized to receive a lab animal;
a stimulus device positioned above the second base member and operative to project an aversive stimulus towards the second base member; and
a box removably positioned on a top surface of the second base member between the second base member and the stimulus device, the box including a main portion, a ceiling portion, a floor portion, and a plurality of grooves corresponding with the ceiling portion and the floor portion, the box configured to selectively contain the lab animal.

2. The apparatus of claim 1, wherein the top surface of the second base member is configured to support the lab animal.

3. The apparatus of claim 2, wherein the first base member includes a first plate and the second base member includes a second plate, and the first and second plates are parallel to each other.

4. The apparatus of claim 1, wherein the stimulus device includes at least one of a lighting device operative to project light towards the second base member, a white noise generator operative to project an audible signal towards the second base member, and a fan operative to blow air towards the second base member.

5. The apparatus of claim 1, further comprising at least one metal member coupled to the first base member and positioned in the interior region, and a shock device configured to deliver electrical current to the at least one metal member.

6. The apparatus of claim 5, wherein the shock device is configured to selectively deliver electrical current to each of a plurality of metal members positioned in the interior region.

7. The apparatus of claim 1, further including a wall extending around an outer portion of the second base member to define an enclosed region above a top surface of the second base member configured to contain the lab animal.

8. The apparatus of claim 1, further including a plurality of walls positioned in the interior region between the first and second base members, the plurality of walls forming a plurality of compartments in the interior region, each compartment being aligned with at least one of the plurality of apertures.

9. The apparatus of claim 1, further including a plurality of caps configured to close off a subset of the plurality of apertures such that only one aperture is open to the interior region.

10. The apparatus of claim 1, wherein the apparatus has a cylindrical outer profile.

11. The apparatus of claim 1, wherein the plurality of apertures are equidistant from each other and are equidistant from an outer edge of the second base member.

12. The apparatus of claim 1, wherein the majority of a top surface of the first base member has a dark color and the majority of a top surface of the second base member has a light color.

13. The apparatus of claim 1, further including:
- at least one sensing device operative to detect a location of the lab animal; and
- a controller in communication with the at least one sensing device, the controller being operative to initiate a training event in response to the detected location of the lab animal.

14. The apparatus of claim 13, wherein the training event includes at least one of an electrical shock by a shock device, a delivery of food by a food dispenser, and a projection of the aversive stimulus by the stimulus device.

15. The apparatus of claim 1, wherein the box further includes an end cap and an aperture,
the aperture configured to partially receive an inserted object.

* * * * *